(12) United States Patent
Takeuchi

(10) Patent No.: US 7,986,348 B2
(45) Date of Patent: Jul. 26, 2011

(54) PHOTOMETRIC DEVICE

(75) Inventor: Hiroshi Takeuchi, Tokyo (JP)

(73) Assignee: Nikon Corporation, Tokyo (JP)

(*) Notice: Subject to any disclaimer, the term of this patent is extended or adjusted under 35 U.S.C. 154(b) by 540 days.

(21) Appl. No.: 12/219,595

(22) Filed: Jul. 24, 2008

(65) Prior Publication Data

US 2009/0051795 A1 Feb. 26, 2009

(30) Foreign Application Priority Data

Jul. 25, 2007 (JP) ................. 2007-193547

(51) Int. Cl.
 H04N 5/228 (2006.01)
 H04N 5/235 (2006.01)
 H04N 3/14 (2006.01)
 H04N 5/335 (2011.01)

(52) U.S. Cl. ............... 348/230.1; 348/222.1; 348/229.1; 348/297; 348/298

(58) Field of Classification Search .... 348/229.1–230.1, 348/297–299; 250/208.1–208.6
See application file for complete search history.

(56) References Cited

U.S. PATENT DOCUMENTS

| 6,670,993 B1* | 12/2003 | Yamamoto et al. | 348/362 |
| 6,909,462 B1* | 6/2005 | Shinotsuka et al. | 348/308 |
| 7,714,903 B2* | 5/2010 | Pertsel et al. | 348/229.1 |
| 2008/0055440 A1* | 3/2008 | Pertsel et al. | 348/297 |

FOREIGN PATENT DOCUMENTS

| JP | B2-04-057152 | 9/1992 |
| JP | A-2006-106617 | 4/2006 |

* cited by examiner

*Primary Examiner* — Jason Chan
*Assistant Examiner* — Pritham Prabhakher
(74) *Attorney, Agent, or Firm* — Oliff & Berridge, PLC

(57) ABSTRACT

A photometric device includes a storage-type photometric sensor, a first control means that performs accumulation control on the photometric sensor based upon an average value of an output of the photometric sensor, a second control means that performs accumulation control on the photometric sensor based upon a maximum value of the output of the photometric sensor, and an accumulation control means that controls the second control means to perform next accumulation control, if the maximum value of the output of the photometric sensor on which the accumulation control is performed by the first control means exceeds a saturation output level of the photometric sensor, and controls the first control means to perform next accumulation control, if the maximum value of the output of the photometric sensor does not exceed the saturation output level of the photometric sensor.

13 Claims, 2 Drawing Sheets

PHOTOMETRIC DEVICE

INCORPORATION BY REFERENCE

The disclosure of the following priority application is herein incorporated by reference: Japanese Patent Application No. 2007-193547 filed on Jul. 25, 2007

BACKGROUND OF THE INVENTION

1. Field of the Invention

The present invention relates to a photometric device of a camera.

2. Description of Related Art

Using a storage-type photometric sensor, a technique is known (Japanese Patent Laying-Open Publication H4-57152) for changing over between a first method of control in which accumulation by a photometric sensor is controlled so that the maximum value of the output of the photometric sensor is not saturated and moreover attains a value that is close to its saturation level, and a second method of control in which the accumulation by the photometric sensor is controlled based upon the average level of the output of the photometric sensor.

According to the prior art technique described above, if, for example, there is no surplus in the time period for obtaining the sensor information, and only one or the other of the above types of accumulation control is performed, then the problem arises as to which one of these types of accumulation control should be performed to obtain sensor information.

SUMMARY OF THE INVENTION

A photometric device according to a first aspect of the present invention includes a storage-type photometric sensor, a first control means that performs accumulation control on the photometric sensor based upon an average value of an output of the photometric sensor, a second control means that performs accumulation control on the photometric sensor based upon a maximum value of the output of the photometric sensor, and an accumulation control means that controls the first control means and the second control means so as to cause the second control means to perform next accumulation control, if the maximum value of the output of the photometric sensor on which the accumulation control is performed by the first control means exceeds a saturation output level of the photometric sensor, and so as to cause the first control means to perform next accumulation control, if the maximum value of the output of the photometric sensor does not exceed the saturation output level of the photometric sensor.

According to a second aspect of the present invention, with the photometric device according to the first aspect, if the maximum value of the output of the photometric sensor exceeds the saturation output level of the photometric sensor, and if a condition in which the output of the photometric sensor is approximately equal to its previous output obtained through the accumulation control previously performed has been repeated a predetermined number of times, then it is desirable for the accumulation control means to control the first control means and the second control means so as to cause the second control means to perform next accumulation control.

According to a third aspect of the present invention, with the photometric device according to the second aspect, if the maximum value of the output of the photometric sensor exceeds the saturation output level of the photometric sensor, and if a condition in which the output of the photometric sensor is approximately equal to its previous output obtained through the accumulation control previously performed has not been the case for the predetermined number of times, or has been repeated for more than the predetermined number of times, then it is desirable for the accumulation control means to control the first control means and the second control means so as to cause the first control means to perform next accumulation control.

According to a fourth aspect of the present invention, with the photometric device according to the first aspect, it would also be acceptable, if the maximum value of the output of the photometric sensor exceeds the saturation output level of the photometric sensor, and if a condition in which the output of the photometric sensor is approximately equal to its previous output obtained through the accumulation control previously performed is repeated, for, once in each predetermined number of times, the accumulation control means to control the first control means and the second control means so as to cause the second control means to perform next accumulation control.

According to a fifth aspect of the present invention, with the photometric device according to any one of the first through the fourth aspects, it is desirable for the light reception surface of the photometric sensor to be subdivided into a plurality of regions, and for the photometric sensor to provide the output for each of the regions. And it is desirable for the accumulation control means to decide upon the approximate equality if, for each corresponding output, a difference between the previous output of the photometric sensor obtained through the accumulation control previously performed and its recent output obtained through the accumulation control recently performed is less than or equal to a predetermined value.

According to a sixth aspect of the present invention, the photometric device according to any one of the first through the fifth aspects may further include a calculation means that performs photometric calculation based upon the output of the photometric sensor, a storage means that stores a representative luminance value that is representative of the screen, calculated by the calculation means based upon the output of the photometric sensor when the maximum value of the output of the photometric sensor does not exceed the saturation output level of the photometric sensor, and an average luminance value of the screen, calculated by the calculation means based upon the output of the photometric sensor, and a correction means that, if the maximum value of the recent output of the photometric sensor exceeds the saturation output level of the photometric sensor, corrects the representative luminance value stored in the storage means using a difference between the average luminance value stored in the storage means and an average luminance value of the screen calculated by the calculation means based upon the output of the photometric sensor that is saturated.

DESCRIPTION OF PREFERRED EMBODIMENTS

Figure 1:
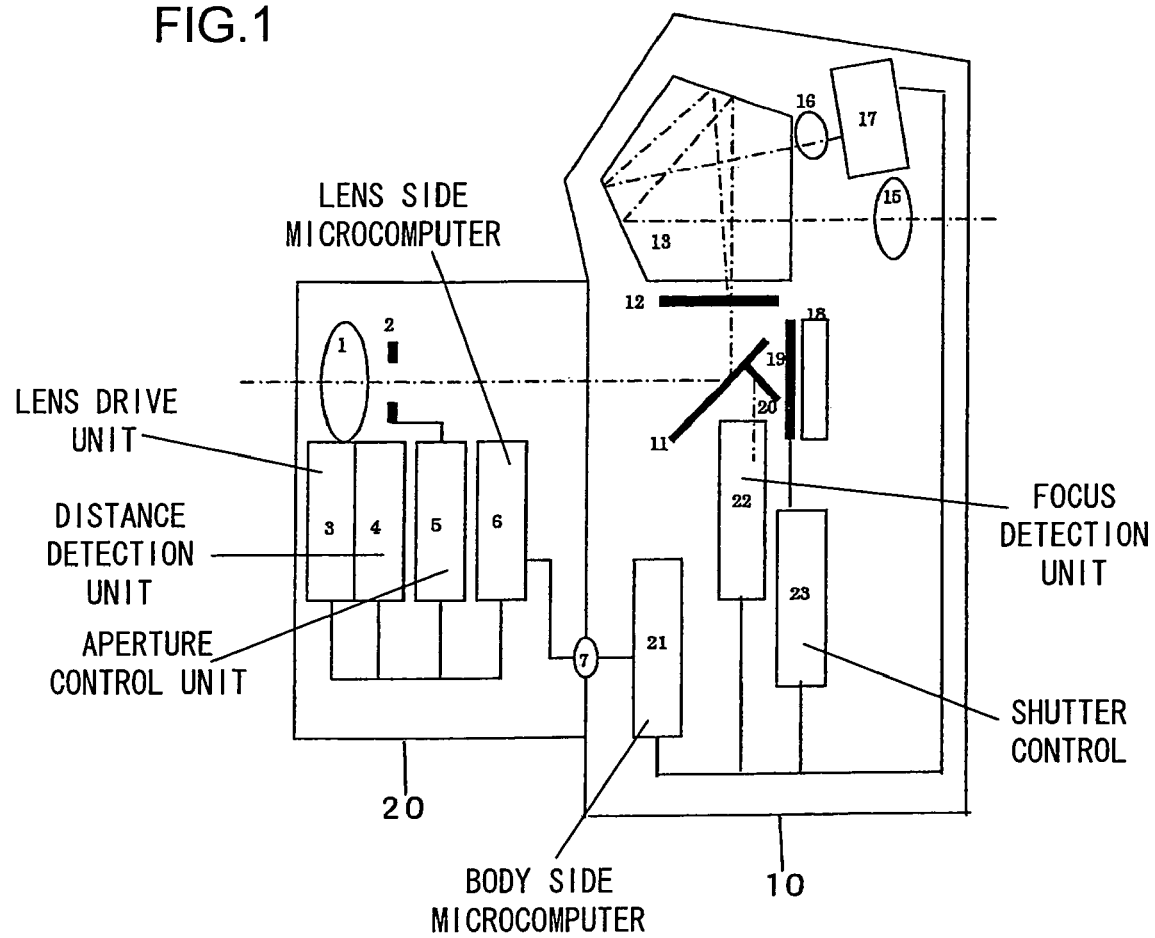
FIG. 1 is a figure for explanation of the structure of the principal portions of a single lens reflex electronic camera according to an embodiment of the present invention.

In the following, preferred embodiments for implementation of the present invention will be explained with reference to the drawings. FIG. 1 is a figure for explanation of the structure of the principal portions of a single lens reflex electronic camera according to an embodiment of the present invention. In FIG. 1, an interchangeable lens 20 is fitted to a camera main body 10. The interchangeable lens 20 is built so as to be fittable to and removable from the camera main body 10.

The camera main body 10 includes a body side microcomputer 21, a focus detection unit 22, a shutter control unit 23, a quick return mirror 11, a focusing plate 12, a roof pentaprism 13, an eyepiece lens 15, a lens 16, a photometric unit 17, an image sensor 18, and a shutter 19. The interchangeable lens 20 includes a photographic lens 1, an aperture 2, a lens drive unit 3, a distance detection unit 4, an aperture control unit 5, and a lens side microcomputer 6. When the interchangeable lens 20 is fitted to the camera main body 10, the lens side microcomputer 6 and the body side microcomputer 21 are connected together via electrical contact points 7.

The body side microcomputer performs well known exposure calculation and well known auto focus (AF) calculations and so on when, for example, a release switch (not shown in the figures) is half press actuated, and starts photographic control when a release switch (not shown in the figures) is full press actuated. The body side microcomputer 21 further performs communication with the lens side microcomputer 6. The information that the body side microcomputer 21 transmits to the lens side microcomputer 6 is a shift amount and a shift direction for a focus adjustment optical system that have been calculated by AF calculation, a restriction amount for the aperture 2 that has been calculated by exposure calculation, and soon. Here, the focus adjustment optical system corresponds to a lens for focus adjustment that is included in the photographic lens 1.

The lens side microcomputer 6 performs communication with the body side microcomputer 21, drive control of the focus adjustment optical system, restriction control of the aperture 2, and the like. The shifting of the focus adjustment optical system is performed by the lens side microcomputer 6 sending commands to the lens drive unit 3 according to data acquired from the body side microcomputer 21, so as to make the focus adjustment optical system shift forwards and backwards along the direction of the optical axis. Moreover, restriction of the aperture 2 is performed by the lens side microcomputer 6 sending commands to the aperture control unit 5 according to data acquired from the body side microcomputer 21, so as to restrict the size of the aperture 2. And, based upon a detection signal outputted by a detection device (not shown in the figures), the distance detection unit 4 detects a signal that indicates the shifting distance of the focus adjustment optical system. When the focus adjustment optical system shifts to a focused position, a sharp image of the main photographic subject is focused upon the image sensor 18 and the photometric unit 17 in the camera main body 10.

Before full press actuation of the release switch, the light from the photographic subject that passes through the photographic lens 1 and the aperture 2 and is incident into the camera main body 10 is conducted upwards by the quick return mirror 11 that is positioned as shown in the figure, and is imaged upon the focusing plate 12. This light is further incident upon the roof pentaprism 13. The roof pentaprism 13 on the one hand conducts this incident light from the photographic subject to the eyepiece lens 15, while also conducting a portion thereof to the lens 16. The light that is incident upon the lens 16 is then incident upon the photometric unit 17, and thereby an image of the photographic subject is imaged upon the photometric unit 17.

The photometric unit 17 includes an image sensor for photometry (for example a CCD image sensor) that includes a plurality of photoelectric conversion elements that correspond to pixels. This image sensor for photometry captures the image of the photographic subject that is imaged upon the photometric unit 17, and outputs a photoelectric conversion signal that corresponds to the brightness of the image of the photographic subject to the body side microcomputer 21. And the body side microcomputer 21 performs predetermined exposure calculation based upon the photoelectric conversion signal outputted from the image sensor for photometry, and thereby determines a control aperture value and a control shutter speed.

Furthermore, a portion of the light from the photographic subject passes through the quick return mirror 11, and is conducted downwards to the focus detection unit 22 by a sub-mirror 20. The focus detection unit 22 includes an image sensor (for example a CCD image sensor) for detecting the defocus amount by a phase difference detection method. This image sensor for detecting the defocus amount captures an image of the photographic subject that is imaged upon it, and outputs to the body side microcomputer 21 a photoelectric conversion signal corresponding to the brightness of this photographic subject image. And the body side microcomputer 21 performs AF calculation based upon the photoelectric conversion signal outputted from the image sensor for detecting the defocus amount of the focus detection unit 22, and thereby calculates the defocus amount.

In concrete terms, the relative amount of positional deviation (i.e. the relative gap) is obtained between two images that are captured at mutually different positions upon the image sensor for detecting the defocus amount, these being images due to a pair of ray bundles for detecting the defocus amount that are incident via regions of the photographic lens 1 that are different. This pair of images of the photographic subject are close together in the so called pre-focus state in which the photographic lens 1 focuses a clear image of the photographic subject before the prearranged focal plane, and conversely are far apart from one another in the so called post-focus state in which the photographic lens 1 focuses a clear image of the photographic subject after the prearranged focal plane. In the state in which a clear image of the photographic subject is focused at the prearranged focal plane, the above described pair of images mutually coincide. Accordingly, by obtaining the relative amount of positional deviation between the pair of images, the focus adjustment state of the photographic lens 1, in other words the defocus amount, may be obtained. The body side microcomputer 21 determines a forwards or backwards shift amount and a shift direction for the focus adjustment optical system according to this defocus amount, and transmits the required data to the lens side microcomputer 6.

After full press actuation of the release switch, the quick return mirror 11 rotates out of the optical path. And the light from the photographic subject is conducted to the image sensor 18 for photography via the shutter 19, so that an image of the photographic subject is imaged upon its photographic image surface. The image sensor 18 consists of an image sensor for photography (for example, a CCD image sensor) that has a plurality of photoelectric conversion elements that corresponding to pixels. And the image sensor 18 captures an image of the photographic subject that is imaged upon its photographic image surface, and outputs a photoelectric conversion signal corresponding to the brightness of this image of the photographic subject.

Division into Regions

The body side microcomputer 21 groups the pixels of the image sensor for photometry (the photometric unit 17) into a number of predetermined regions, and deals with the photoelectric conversion signals from the pixels that belong to each group as a group unit. For example, the photometric range of the image sensor for photometry may be divided into a total of 48 regions, 8 along the horizontal direction (the X direction) and 6 along the vertical direction (the Y direction). For each of these subdivided regions, the body side microcomputer 21 adds together the photoelectric conversion signals from the plurality of pixels included in that region, and takes the result of this addition as being the photometric information for that region.

The Dynamic Range of the Photometric Sensor

When using a storage-type photometric sensor like a CCD sensor as the image sensor for photometry of the photometric unit 17, its dynamic range is limited by saturation of its output and noise level and A/D conversion resolution and the like. For example, the dynamic range when A/D conversion is performed at a 10-bit length is of the order of 7 steps of EV value (exposure value). In this case, in order to obtain luminance information in the range of EV1~EV20 (for example), the body side microcomputer 21 performs changing over according to the photometric information that is being attempted to be obtained from the photometric unit 17. This changing over of the photometric range is performed by changing at least one of the electric charge accumulation time period T of the CCD image sensor described above, and its amplification gain G with respect to the accumulated signal.

Normally, when obtaining luminance information from the photometric unit 17 for exposure calculation, the body side microcomputer 21 performs "accumulation control based upon the peak value". Moreover, when obtaining luminance information from the photometric unit 17 for analyzing the photographic scene (for example, when performing estimation of the composition or the state of the light source, when deciding upon the backlighting state, or when performing estimation of the position of the photographic subject or the like), it performs "accumulation control based upon the average value".

Accumulation Control Based Upon the Peak Value

When it is desired to acquire the maximum luminance value as the photometric information, then the body side microcomputer 2 performs accumulation control for the photometric unit 17 based upon its peak value. According to this accumulation control, in the case of (for example) a photographic scene in which the sun is positioned to the rear of a person, the body side microcomputer 21 determines the photometric range so as to bring the pixel signal values for the sun close to the maximum luminance target level (it should be understood that the maximum luminance target level is lower than the saturation level). Due to this, while the pixel signals for the sun region that have been obtained from the photometric unit 17 are not saturated, the pixel signals for the other regions including the person become lower than the average luminance level (in other words, the luminance of those pixel signals may become dark or may become smudged with black).

Accumulation Control Based Upon the Average Value

When it is desired to acquire the average luminance value as the photometric information, then the body side microcomputer 21 performs accumulation control for the photometric unit 17 based upon its average value. According to this accumulation control, in the case of the above described photographic scene in which the sun is positioned to the rear of a person, the body side microcomputer 21 determines the photometric range so as to bring the average pixel signal value upon the screen close to the average luminance target level. Due to this, while the pixel signals for the sun region that have been obtained from the photometric unit 17 are saturated, the pixel signals for the other regions including the person become close to the average luminance level.

Control of the Photometric Sensor

Figure 2:
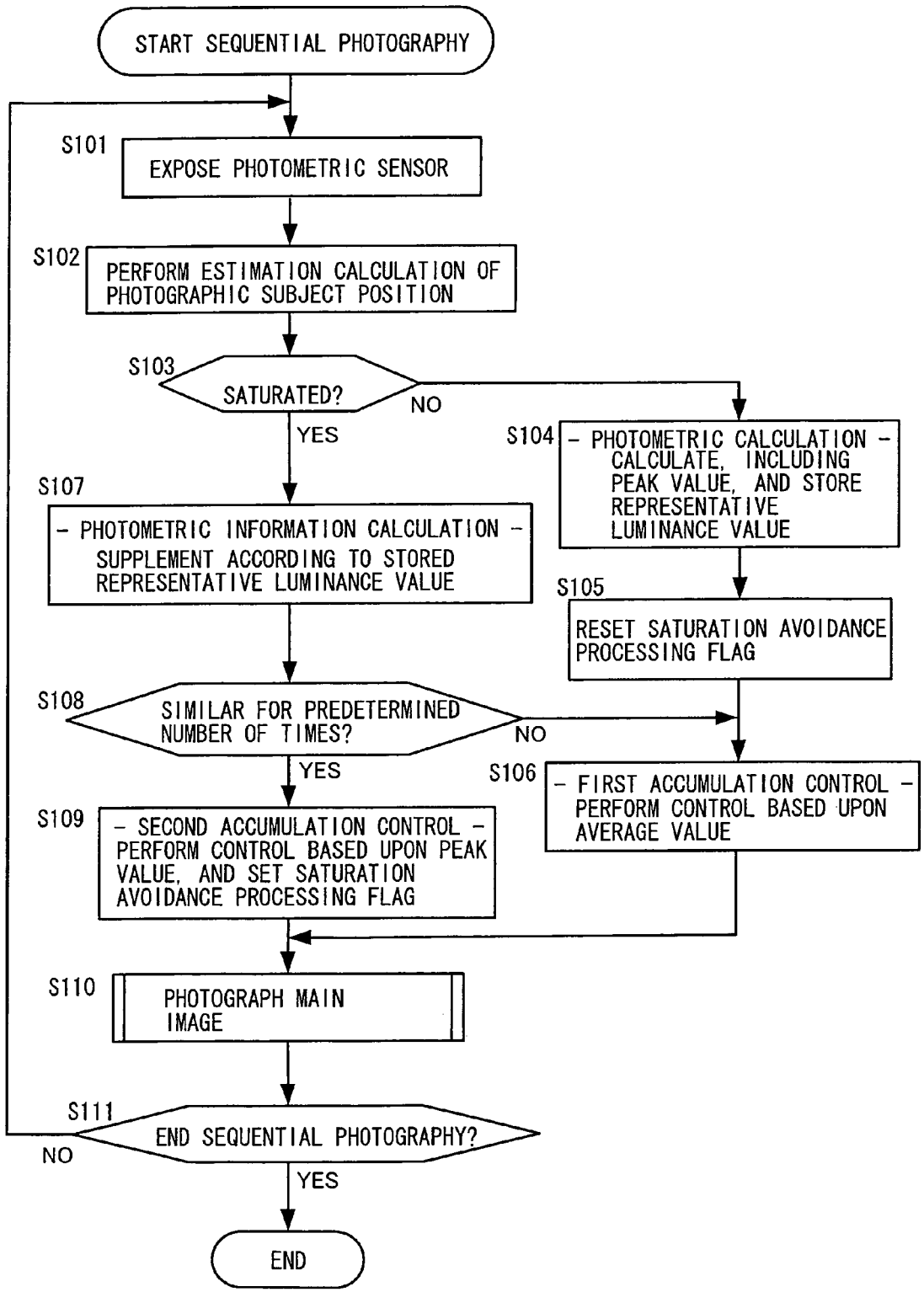
FIG. 2 is a flow chart for explanation of the flow of photographic processing performed by a body side microcomputer.

When the time period available for acquiring the luminance information with the photometric unit 17 is short, as for example during sequential shooting photography, the body side microcomputer 21 of this embodiment performs photometric sensor control in the following manner. FIG. 2 is a flow chart for explanation of the flow of photographic processing that is performed by the body side microcomputer 21. The body side microcomputer 21 starts the processing in FIG. 2 when, during the photographic mode for performing sequential shooting photography, the release switch (not shown in the figures) is full press actuated.

In a step S101 of FIG. 2, the body side microcomputer 21 performs exposure of the photometric sensor, in other words performs exposure of the image sensor for photometry that is included in the photometric unit 17 (including electric charge accumulation and amplification of the accumulated signals), and then the flow of control proceeds to a step S102. In this step S102, the body side microcomputer 21 performs estimation calculation of the position of the photographic subject, and then the flow of control proceeds to a step S103.

This calculation for estimation of the photographic subject position will now be explained. In the image sensor for photometry (the photometric unit 17), in a similar manner to the case of the image sensor 18 for photography, R (red), G (green), and B (blue) color filters upon its photographic image surface are provided so as to correspond to the positions of the pixels. Since the image sensor for photometry captures an image of the photographic subject that passes through these color filters, accordingly the photoelectric conversion signal that is outputted from the image sensor for photometry includes color information for the RGB color system.

For each of the above described 48 subdivided regions, the body side microcomputer 21 adds together each of the R component signals, the G component signals, and the B component signals from the pixels included in that region, and takes the results of those additions as being the photometric information for that region. Here, the photometric information for the R component will be denoted by R[X, Y], the photometric information for the G component will be denoted by G[X, Y], the photometric information for the B component will be denoted by B[X, Y]. Here X=1~8 and Y=1~6.

In this embodiment it is arranged for the photometric information to be acquired in advance at the time point that the release switch (not shown in the figures) is half press actuated, i.e. before the release switch is full press actuated and the processing of FIG. 2 is started. In the step S102, the body side microcomputer 21 compares together the photometric information for the region in the center of the screen i.e. the region X=4 and 5, Y=3 and 4) among the photometric information that was previously acquired during half press actuation in the past, and the photometric information that has been obtained in the step S101 by exposure of the photometric sensor. And it estimates that the main photographic subject is positioned in that subdivided region for which, among the photometric information acquired in the step S101, that photometric information has been acquired whose color components are closest to those of the information that was acquired for the region in the center of the screen at the time point of half press actuation.

It should be understood that, if the step S102 is being executed for the second or subsequent time after the processing in FIG. 2 has started, then, instead of using the photometric information that was acquired at the time point of half press actuation of the release switch (not shown in the figures), it would also be acceptable to arrange to use the photometric information that was acquired the time before. In this case, among the photometric information that was acquired the time before, the photometric information for the region in the center of the screen (X=4 and 5, Y=3 and 4) and the photometric information that has been acquired by exposure of the photometric sensor in the step S101 would be compared together.

In the step S103, the body side microcomputer 21 decides whether or not the signal values that have been acquired by the photometric unit 17 are saturated. If some signal value that exceeds the saturation signal level is included in the photometric information acquired in the step S101, then the body side microcomputer 21 reaches an affirmative decision in this step S103 and the flow of control is transferred to a step S107. But, if no signal value that exceeds the saturation signal level is included in the photometric information acquired in the step S101, then the body side microcomputer 21 reaches a negative decision in this step S103 and the flow of control proceeds to a step S104.

In the step S104, the body side microcomputer 21 performs photometric calculation, and then the flow of control proceeds to a step S105. For example, a luminance value that represents the scene may be calculated by a photometric algorithm that uses the photometric outputs of the subdivided regions, as disclosed in Japanese Laid-Open Patent Publication 2006-106617. In this example, in particular, the maximum photometric value is used, and it is very important for no saturated signal to be included in the photometric information. In this embodiment, the luminance value that has been obtained in this manner is stored in a non-volatile memory within the body side microcomputer 21 as a luminance value BVrem that is representative of the scene. The body side microcomputer 21 further calculates the luminance value using the photographic information for the entire screen (i.e. for all 48 regions thereof), and stores the result in the non-volatile memory within the body side microcomputer 21 as the average value BVaverem of the luminance value. It would also be acceptable, when performing this storage in the non-volatile memory, to arrange to perform updating storage in which the most recent luminance value BVrem and the average value BVaverem are both stored.

In the step S105, the body side microcomputer 21 resets a saturation avoidance processing flag, and then the flow of control proceeds to a step S106. This saturation processing avoidance flag is a flag that is set when performing accumulation control based upon the peak value in a step S109 that will be described hereinafter. In the step S106, the body side microcomputer 21 sets, for the photometric unit 17, a photometric range that is determined based upon the average value (first accumulation control), and then the flow of control is transferred to a step S110.

In concrete terms, the average value Vave of the pixel signal values over the entire screen, that={Σ(the signal values for each of the various regions)}/(the total number of pixels) is obtained, and a photometric range G*T based upon the average value is determined as being G*T=(output target value)/Vave*(the gain that was set during exposure of the photometric sensor this time (in the step S101))*(the accumulation time period that was set during exposure of the photometric sensor this time (in the step S101)). Here, G is the gain during exposure of the photometric sensor the next time, and T is the accumulation time period during exposure of the photometric sensor the next time. Due to this, the photometric range during exposure of the photometric sensor the next time is determined so as to bring the average value of the pixel signals over the screen close to the target level.

In the step S107 that is reached upon an affirmative decision in the step S103, the body side microcomputer 21 performs calculation of the photometric information, and then the flow of control proceeds to a step S108. In concrete terms, it takes the average value of the luminance values that have been obtained from the photometric information for the entire screen (i.e. for all its 48 regions) as being the average value BVave, and calculates a luminance value BV that is representative of the screen by the equation BV=BVrem+BVave−BVaverem. It should be understood that the average value BVave that was obtained from the photometric information acquired in the step S101 may be stored as an update in the non-volatile memory, so that the most recent value is stored. The luminance value BV that is calculated takes as a reference the luminance value BVrem that is representative of the screen when the signal values are not saturated, and is one that is supplemented by using the amount of relative change between the average value BVave of the luminance values over the entire screen that were calculated from the most recent photometric information, and the average value BVaverem of the luminance values over the entire screen at the time point that BVrem was calculated. It should be understood that, during half pressing of the release switch before sequential photography is entered upon, processing to calculate and to store a luminance value that is representative of the screen from the luminance value information for the screen acquired when the maximum value of the output of the photometric sensor by accumulation control based upon the peak value does not exceed the saturation output level, and processing to calculate and to store an average luminance value for the screen from the luminance value information acquired by accumulation control based upon the average value, are performed alternatingly. In the step S107, if BVrem and BVaverem after the start of sequential photography are not calculated, then the luminance value representative of the screen that was obtained while performing accumulation control based upon the peak value before the start of sequential photography is used as BVrem, and moreover the average luminance value that was obtained while performing accumulation control based upon the average value before the start of sequential photography is used as BVaverem.

In the step S108, the body side microcomputer makes a decision as to whether or not the state of the composition or of the light source is similar for a predetermined number of times. For example, the body side microcomputer 21 may calculate the position of that region, among the 48 subdivided regions, whose luminance is highest, and the luminance value of that region, each time the photometric sensor is exposed, and may store the results in the non-volatile memory within the body side microcomputer 21. And the body side microcomputer 21 may compare the position of the highest luminance region and the value of the highest luminance with the corresponding values calculated during exposure of the photometric sensor the previous time, and may reach an affirmative decision in this step S108 and proceed to the step S109, if the decision that the respective differences between them are within predetermined ranges has been repeated a predetermined number of times (for example, twice).

The body side microcomputer 21 reaches a negative decision in the step S108 and transfers the flow of control to the step S106, if the number of times of repetition described above is less than two times or is greater than or equal to three times, or if the difference in at least one of the position of the highest luminance region, and the highest luminance value, exceeds its predetermined range described above. If the position of the highest luminance region and the highest luminance value are not changed from their values when the photometric sensor was exposed the previous time, then it is considered that the state of the composition or of the light sources that are included in the screen is approximately equal to what it was when the photometric sensor was exposed the previous time.

It should be understood that, when making the decision in the step S108, if the saturation avoidance processing flag is set, the body side microcomputer 21 is adapted to make an affirmative decision without counting the number of times of repetition as described above. Due to this, it is possible to repeatedly continue accumulation control based upon the peak value while the signal value acquired by the photometric unit 17 is saturated.

In the step S109, the body side microcomputer 21 sets the photometric range that has been determined based upon the peak value for the photometric unit 17 (second accumulation control). In concrete terms, it changes the gain G during exposure of the photometric sensor the next time or the accumulation time period T during exposure of the photometric sensor the next time to ⅛ of the gain or of the accumulation time period during the exposure of the photometric sensor this time (the step S101). By doing this, the photometric range during exposure of the photometric sensor the next time is determined so as to make it difficult for the maximum value of the pixel signal upon the screen to become saturated. The body side microcomputer 21 furthermore sets the saturation avoidance processing flag, and then the flow of control proceeds to the step S110.

In the step S110, the body side microcomputer 21 performs photographic processing for the main image, and then the flow of control proceeds to a step S111. In concrete terms, it rotates the quick return mirror 11 out of the optical path, drives the aperture 2 to a control aperture value based upon the result of calculation in the step S104 or the stop S107, and performs exposure control of the image sensor 18 with an accumulation time period for photography corresponding to a control shutter speed based upon the result of calculation in the step S104 or the stop S107. After capture of an image by the image sensor 18, it returns the quick return mirror 11 to the optical path, and drives the aperture 2 towards the opened side. The data for the image that has been acquired by the image sensor 18 is recorded upon a recording medium not shown in the figures after predetermined signal processing.

In the step S111, the body side microcomputer 21 decides whether or not sequential photography has ended. If a full press actuation signal is being continuously inputted from the release switch (not shown in the figures), then the body side microcomputer 21 reaches a negative decision in this step S111, and the flow of control is returned to the step S101. In this case, exposure of the photometric sensor is performed (in the step S101) in order to perform photography of the next frame, and the processing described above is repeated. On the other hand, if no full press actuation signal is being inputted from the release switch (not shown in the figures), then the body side microcomputer 21 reaches an affirmative decision in this step S111, and the processing of FIG. 2 terminates.

It should be understood that the body side microcomputer 21 of this embodiment is adapted, if a half press actuation signal is being inputted from the release switch (not shown in the figures), to perform both the exposure of the photometric sensor that it performs after having been set for first accumulation control in a similar manner to the step S106, and the exposure of the photometric sensor that it performs after having been set for second accumulation control, in a similar manner to the step S109, alternatingly. Accordingly, at the time point that the processing of FIG. 2 starts, photometric information that has been acquired at the time of half press actuation is stored in the non-volatile memory within the body side microcomputer 21.

According to the embodiment explained above, the following advantageous operational effects may be obtained.

(1) Since it is arranged for the body side microcomputer 21 to perform the acquisition of the photometric information that is performed by the storage-type photometric sensor included in the photometric unit 17 only once for each photographic frame during sequential shooting photography, accordingly it is possible to shorten the sequential shooting interval, as compared to the case in which this is performed twice or more.

(2) If the signal value that has been acquired by the storage-type photometric sensor included in the photometric unit 17 is saturated, then the photometric sensor control for the next photographic frame is set to accumulation control based upon the peak value (in the step S109); and, if this signal value is not saturated, then the photometric sensor control for the next photographic frame is set to accumulation control based upon the average value (in the step S106). By doing this, if the signal value has been saturated, then it is possible to reduce the danger of the signal value acquired by the photometric sensor becoming saturated during photography of the next frame. If the signal value is not saturated, then photometric information is obtained that is suited to analysis of the photographic scene (estimation of the position of the photographic subject, decision as to the state of the composition and the light source, decision as to the state of backlighting, and the like).

(3) If the body side microcomputer 21 has decided that the signal value that has been acquired by the photometric unit 17 is saturated, and the composition or the state of the light source has been similar for the predetermined number of times, and while the saturation avoidance processing flag is set, it sets the control of the photometric sensor for photography of the next frame to accumulation control based upon the peak value (in the step S109). By doing this, it is possible to obtain photometric information that is more suitable for calculation in order to determine a tone curve for photometric calculation for exposure control or for image processing, than for analysis of the photographic scene.

(4) If the body side microcomputer 21 has decided that the state of the composition or of the light source has not been similar for the predetermined number of times, then it sets the control of the photometric sensor for photography of the next frame to accumulation control based upon the average value (in the step S106). By doing this, it is possible to obtain photometric information that is more suitable for analysis of the photographic scene, than for exposure calculation or tone curve calculation.

(5) If the signal values that have been acquired by the photometric sensor are saturated, then it is arranged to calculate the luminance value BV that is representative of the screen according to the equation BV=BVrem+BVave−Bvaverem (in the step S107). By thus taking as a reference the luminance value BVrem that is representative of the screen when the signal values are not saturated, and by calculating the luminance value BV that has been corrected by using, in a supplementary manner, the amount of relative change between the average value BVave of the luminance values over the entire screen that has been calculated from the most recent photometric information, and the luminance value BVaverem over the entire screen at the time point that BVrem was calculated, it is possible to acquire an appropriate luminance value BV that is representative of the screen, even though the signal values that have been acquired by the photometric sensor are saturated. By performing the exposure calculation using this appropriate luminance value BV, it is possible appropriately to control the exposure during the photographic processing of the main image (in the step S110). Moreover, if calculation of a tone curve is performed using this appropriate luminance value BV, then a tone characteristic of high quality level is obtained.

(6) Since the luminance information is calculated for each of the subdivided regions, accordingly, as compared to the case in which it is calculated by units of pixels, it is possible to make it more difficult to experience influence from anomalous values that may be caused due to the influence of noise that is included in the signal or if some pixel defect occurs in the photometric sensor. It should be understood that, it would also be acceptable to arrange to calculate the average value of the signal values of the G color component, instead of calculating the average luminance value for each of the subdivided regions.

Variant Embodiment #1

It would also be acceptable to calculate the average value Vave of the pixel signal values over the entire screen, obtained in the step S106, as follows. If the weighting for each of the regions is termed Wait [region], that may for example be 1.0 in the center of the screen and 0.5 at the edges of the screen, then a value that is suitable for center priority control may be calculated. In concrete terms, Vave is obtained as: Vave= [Σ{Wait[region]*(signal value for each region)}]/{Σ(Wait [region])}. In a similar manner to the case described above, the photometric range G*T based upon this average value is determined by: G*T=(output target value)/Vave*(gain that was set during exposure of the photometric sensor in the step S101 this time)*(accumulation time period that was set during exposure of the photometric sensor in the step S101 this time).

Variant Embodiment #2

It would also be acceptable to arrange to calculate the gain G during exposure of the photometric sensor the next time and the accumulation time period T during exposure of the photometric sensor the next time, determined in the step S109, as follows. G*T is determined as: G*T=(gain that was set during exposure of the photometric sensor in the step S101 this time)*(accumulation time period that was set during exposure of the photometric sensor in the step S101 this time)*(predetermined constant)/(number of saturated pixel signals). Since, by doing this, the photometric range is set lower the next time in correspondence to the number of pixels whose signal values are saturated, accordingly the photometric range is not set to be lower than necessary.

Variant Embodiment #3

Instead of performing the similarity decision in the step S108, it would also be acceptable to transfer the flow of control to the step S106 each predetermined number of times. In concrete terms, if the signal value is saturated, the flow of control mainly proceeds to the step S109 and the second accumulation control is performed, but after the second accumulation control has been repeated four times, then the flow of control proceeds to the step S106 and the first accumulation control is performed at the next one time. By doing this, in the state in which the signal values are saturated, while mainly acquiring photographic information that is suitable for analysis of the photographic scene, it is also possible to obtain photometric information that is suitable for exposure calculation or for tone curve calculation once each predetermined number of times.

Variant Embodiment #4

It would also be acceptable to arrange to calculate the gain G during exposure of the photometric sensor the next time and the accumulation time period T during exposure of the photometric sensor the next time, determined in the step S109, as follows. G*T is determined as: G*T=(gain that was set during exposure of the photometric sensor in the step S101 this time)*(accumulation time period that was set during exposure of the photometric sensor in the step S101 this time)*(peak output target value)/(photometric output maximum value). By doing this, it is possible to perform control so as to bring the peak output close to an appropriate target value.

The above explanation is only given by way of example; the present invention is not to be considered as being limited in any manner by the structure of the embodiments described above.

What is claimed is:

1. A photometric device, comprising:
   a storage-type photometric sensor;
   a first control means that performs accumulation control on the photometric sensor based upon an average value of an output of the photometric sensor;
   a second control means that performs accumulation control on the photometric sensor based upon a maximum value of the output of the photometric sensor; and
   an accumulation control means that controls the first control means and the second control means so as to cause the second control means to perform next accumulation control, if the maximum value of the output of the photometric sensor on which the accumulation control is performed by the first control means exceeds a saturation output level of the photometric sensor, and so as to cause the first control means to perform next accumulation control, if the maximum value of the output of the photometric sensor does not exceed the saturation output level of the photometric sensor.

2. A photometric device according to claim 1, wherein:
   if the maximum value of the output of the photometric sensor exceeds the saturation output level of the photometric sensor, and if a condition in which the output of the photometric sensor is approximately equal to its previous output obtained through the accumulation control previously performed has been repeated a predetermined number of times, then the accumulation control means controls the first control means and the second control means so as to cause the second control means to perform next accumulation control.

3. A photometric device according to claim 2, wherein:
   if the maximum value of the output of the photometric sensor exceeds the saturation output level of the photometric sensor, and if a condition in which the output of the photometric sensor is approximately equal to its previous output obtained through the accumulation control previously performed has not been the case for the predetermined number of times, or has been repeated for more than the predetermined number of times, then the accumulation control means controls the first control means and the second control means so as to cause the first control means to perform next accumulation control.

4. A photometric device according to claim 1, wherein:
if the maximum value of the output of the photometric sensor exceeds the saturation output level of the photometric sensor, and if a condition in which the output of the photometric sensor is approximately equal to its previous output obtained through the accumulation control previously performed is repeated, then, once in each predetermined number of times, the accumulation control means controls the first control means and the second control means so as to cause the second control means to perform next accumulation control.

5. A photometric device according to claim 1, wherein:
a light reception surface of the photometric sensor is subdivided into a plurality of regions, and the photometric sensor provides the output for each of the regions; and
the accumulation control means decides upon the approximate equality if, for each corresponding output, a difference between the previous output of the photometric sensor obtained through the accumulation control previously performed and its recent output obtained through the accumulation control recently performed is less than or equal to a predetermined value.

6. A photometric device according to claim 1, further comprising:
a calculation means that performs photometric calculation based upon the output of the photometric sensor;
a storage means that stores a representative luminance value that is representative of the screen, calculated by the calculation means based upon the output of the photometric sensor when the maximum value of the output of the photometric sensor does not exceed the saturation output level of the photometric sensor, and an average luminance value of the screen, calculated by the calculation means based upon the output of the photometric sensor; and
a correction means that, if the maximum value of the recent output of the photometric sensor exceeds the saturation output level of the photometric sensor, corrects the representative luminance value stored in the storage means using a difference between the average luminance value stored in the storage means and an average luminance value of the screen calculated by the calculation means based upon the output of the photometric sensor that is saturated.

7. A photometric device according to claim 2, wherein:
a light reception surface of the photometric sensor is subdivided into a plurality of regions, and the photometric sensor provides the output for each of the regions; and
the accumulation control means decides upon the approximate equality if, for each corresponding output, a difference between the previous output of the photometric sensor obtained through the accumulation control previously performed and its recent output obtained through the accumulation control recently performed is less than or equal to a predetermined value.

8. A photometric device according to claim 3, wherein:
a light reception surface of the photometric sensor is subdivided into a plurality of regions, and the photometric sensor provides the output for each of the regions; and
the accumulation control means decides upon the approximate equality if, for each corresponding output, a difference between the previous output of the photometric sensor obtained through the accumulation control previously preformed and its recent output obtained through the accumulation control recently performed is less than or equal to a predetermined value.

9. A photometric device according to claim 4, wherein:
a light reception surface of the photometric sensor is subdivided into a plurality of regions, and the photometric sensor provides the output for each of the regions; and
the accumulation control means decides upon the approximate equality if, for each corresponding output, a difference between the previous output of the photometric sensor obtained through the accumulation control previously performed and its recent output obtained through the accumulation control recently performed is less than or equal to a predetermined value.

10. A photometric device according to claim 2, further comprising:
a calculation means that performs photometric calculation based upon the output of the photometric sensor;
a storage means that stores a representative luminance value that is representative of the screen, calculated by the calculation means based upon the output of the photometric sensor when the maximum value of the output of the photometric sensor does not exceed the saturation output level of the photometric sensor, and an average luminance value of the screen, calculated by the calculation means based upon the output of the photometric sensor; and
a correction means that, if the maximum value of the recent output of the photometric sensor exceeds the saturation output level of the photometric sensor, corrects the representative luminance value stored in the storage means using a difference between the average luminance value stored in the storage means and an average luminance value of the screen calculated by the calculation means based upon the output of the photometric sensor that is saturated.

11. A photometric device according to claim 3, further comprising:
a calculation means that performs photometric calculation based upon the output of the photometric sensor;
a storage means that stores a representative luminance value that is representative of the screen, calculated by the calculation means based upon the output of the photometric sensor when the maximum value of the output of the photometric sensor does not exceed the saturation output level of the photometric sensor, and an average luminance value of the screen, calculated by the calculation means based upon the output of the photometric sensor; and
a correction means that, if the maximum value of the recent output of the photometric sensor exceeds the saturation output level of the photometric sensor, corrects the representative luminance value stored in the storage means using a difference between the average luminance value stored in the storage means and an average luminance value of the screen calculated by the calculation means based upon the output of the photometric sensor that is saturated.

12. A photometric device according to claim 4, further comprising:
a calculation means that performs photometric calculation based upon the output of the photometric sensor;
a storage means that stores a representative luminance value that is representative of the screen, calculated by the calculation means based upon the output of the photometric sensor when the maximum value of the output of the photometric sensor does not exceed the saturation output level of the photometric sensor, and an average luminance value of the screen, calculated by the calculation means based upon the output of the photometric sensor; and a correction means that, if the maximum value of the recent output of the photometric sensor exceeds the saturation output level of the photometric sensor, corrects the representative luminance value stored in the storage means using a difference between the average luminance value stored in the storage means and an average luminance value of the screen calculated by the calculation means based upon the output of the photometric sensor that is saturated.

13. A photometric device according to claim 5, further comprising:
   a calculation means that performs photometric calculation based upon the output of the photometric sensor;
   a storage means that stores a representative luminance value that is representative of the screen, calculated by the calculation means based upon the output of the photometric sensor when the maximum value of the output of the photometric sensor does not exceed the saturation output level of the photometric sensor, and an average luminance value of the screen, calculated by the calculation means based upon the output of the photometric sensor; and
   a correction means that, if the maximum value of the recent output of the photometric sensor exceeds the saturation output level of the photometric sensor, corrects the representative luminance value stored in the storage means using a difference between the average luminance value stored in the storage means and an average luminance value of the screen calculated by the calculation means based upon the output of the photometric sensor that is saturated.

* * * * *